Oct. 3, 1967    P. D. BASS ETAL    3,344,749
CARGO FITTING ASSEMBLY
Filed Oct. 8, 1964

INVENTORS
PAUL D. BASS
ROBERT A. WARREN
By Leon D. Rosen
ATTORNEY

United States Patent Office 3,344,749
Patented Oct. 3, 1967

3,344,749
CARGO FITTING ASSEMBLY
Paul D. Bass, Los Alamitos, and Robert A. Warren, Long Beach, Calif., assignors, by mesne assignments, to McDonnell Douglas Corporation, Santa Monica, Calif., a corporation of Maryland
Filed Oct. 8, 1964, Ser. No. 402,524
5 Claims. (Cl. 105—369)

This invention relates to fastening devices, and more particularly to improvements therein.

Cargo pallets are often held in airplanes and other storage areas by tie-down fittings. Often these fittings are held in tracks which run the length of an airplane fuselage to enable the fittings to be slid along the fuselage until they are in the best position for attaching to ropes or straps which are to pass over the cargo. The fittings are held to the floor by studs which fit within the tracks; however, the fittings must also be securely fastened in place along the tracks so that they do not slide therealong. One method used to prevent sliding is to provide many notches along the track for receiving a plunger of the fitting which holds it in place. The ease and speed with which the plunger can be engaged and disengaged with the notches on the track is important in determining the speed and efficiency of cargo loading and unloading.

Accordingly, one object of the present invention is to provide a plunger mechanism which is easily and rapidly operable without tools.

Another object is to provide a fitting assembly having a plunger for engagement with notches in a track, which is easily locked into position and unlocked.

Another object is to provide a plunger assembly which gives a positive indication of whether it is engaged or disengaged with a part to be held.

Another object is to provide a plunger assembly which is resistant to disengagement by vibrations.

These and other objects of the invention are achieved by a plunger assembly having a plunger which is pressed to cause its engagement with a notch and which is rotated to cause its disengagement. The assembly includes a cam surface formed in the plunger and a set screw follower which engages the cam surface and confines the plunger to a limited up and down movement and to a rotation of 90°. A helical spring serves to bias the plunger longitudinally toward disengagement and rotationally toward engagement with notches. When the plunger is pushed all the way down to cause its engagement with a notch, the helical spring rotates the plunger so that it locks into the downward position. To disengage the plunger it must be pushed downward slightly and then rotated about 90° in opposition to the spring, whereupon it automatically moves upwardly. The helical spring also tends to keep the plunger in a fully upward, disengaged, position.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1:
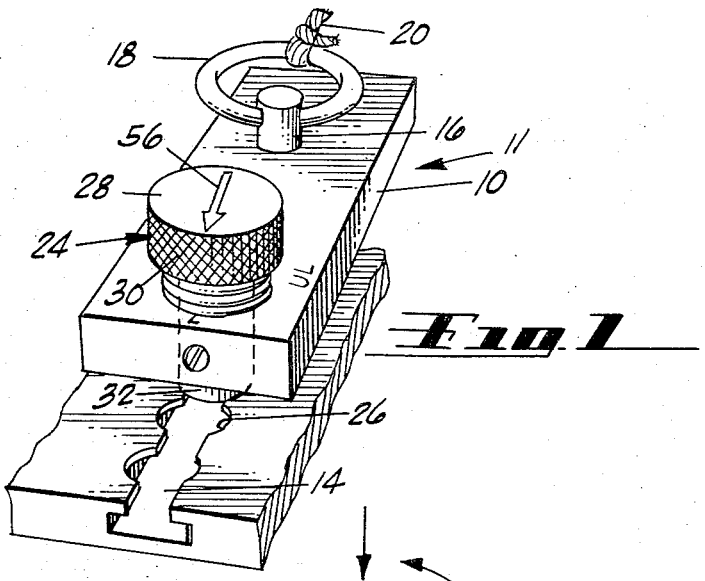
FIGURE 1 is a pictorial view of a fitting constructed in accordance with the invention, shown engaged with a notch of a track.

Reference is now directed to the drawings and particularly FIG. 1 which shows a fitting constructed in accordance with the invention shown in a typical use. The fitting comprises a base 10 having studs 12 (shown in FIG. 3) which engage a track 14 in an airplane fuselage or the like. A ring holder 16 fixed to the base 10 holds a ring 18. A rope 20, which extends around the cargo to be held against shifting, is tied to the ring 18. A plunger assembly mounted on the base 10 includes a plunger 24 which engages one of the notches 26 formed along the track 14 to fix the position of the fitting assembly 11 along the track.

Figure 2:
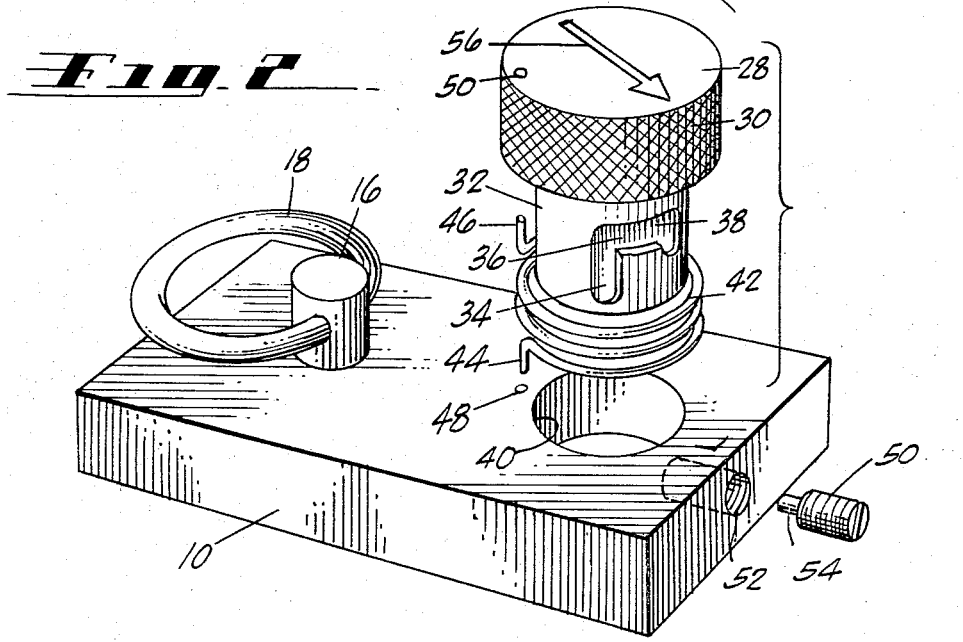
FIGURE 2 is an exploded pictorial view of the fitting of the invention.

The plunger assembly shown in an exploded view in FIG. 2, comprises a knob 28 having a knurled perimeter 30 to enable the knob to be securely grasped in turning. A plunger shank 32, fixed to the knob 28 slides through aperture 40 formed in the base 10. A helical spring 42 is disposed about the shank 32. The spring has two bent ends 44 and 46 which are held in holes 48 and 50 formed in the base 10 and knob 28, respectively. The spring 42 serves to bias the knob 28 of the plunger away from the base, so that the plunger shank 32 tends toward disengagement with notches 26 in the track. The spring 42 also maintains a clockwise rotational bias on the plunger 24 so as to tend to rotate the plunger clockwise.

Figure 3:
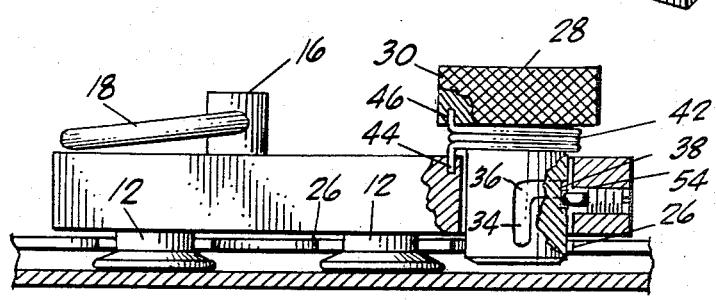
FIGURE 3 is a side sectional view of the fitting of the invention.

The plunger shank 32 includes three connecting cam grooves 34, 36 and 38 formed on its periphery. A set screw 50 engaged in a threaded hole 52 formed in the base includes a follower 54 which engages the cam grooves 34, 36 and 38. When the plunger is in the downward position as shown in FIG. 3, the follower 54 is engaged in the downholding groove 38. The compressive force of the spring 42 holds the follower 54 at the bottom of the groove 38 so that plunger 24 remains engaged with the notch 26 of the track. In order to disengage the plunger 24 from the notch 26, an operator must first push downwardly on the top of the knob 28. Downward pressure on the knob 28 causes the plunger 24 to move downward slightly so that the follower 54 is aligned with the connecting groove 36. The operator then grasps the knurled perimeter 30 of the knob and rotates the knob in a counter-clockwise direction about 90° until the follower 54 is located at the end of groove 36 and is aligned with groove 34. While the knob is held rotated it is allowed to move upward under the compressive force of the spring 42. The plunger 24 moves upwardly until the follower 54 engages the end of the groove 34 furthest from the intermediate groove 36. The plunger is then disengaged from the notch 26 in the track.

When the knob is in the upward direction, it remains stable and in place because the spring 42 holds the plunger so that the bottom of the groove 34 is positively engaged with the follower 54. Although the helical spring 42 tends to rotate the plunger in a clockwise direction, the walls of the groove 34 prevent such rotation.

In order to engage the plunger 24 with a notch 26, the operator merely pushes downwardly on the top of the knob 28 with a force sufficient to overcome the force of spring 42. When the plunger is pushed downwardly far enough that follower 54 engages the transition groove 36, the rotational force of the spring 42 immediately rotates that plunger 24 clockwise by approximately 90° until the follower 54 is aligned with the groove 38. Release of the operator's pressure on the top of the knob 28 enables the compression force of spring 42 to push the follower 54 along the engaging groove 38 to the bottom thereof, thereby holding the plunger firmly engaged with the notch 26.

An operator can easily determine whether the plunger 24 is down or up, and therefore whether the fitting assembly is firmly engaged with a notch 26, by noting the position of an arrow 56 marked on the top of the knob 28. Two markings "L" and "UL" corresponding to the words "locked" and "unlocked" are marked on the base 10 about the knob 28. When the arrow 56 points to the marking UL the plunger 24 is in an unlocked position, or in other words, is disengaged from the notches 26. Similarly, when the arrow 56 points to the marking L, the plunger 24 is in its engaging state wherein it engages a notch 26. Thus, the state of the plunger assembly is automatically indicated.

The plunger assembly is placed in the base by engaging the ends 44 and 46 of the spring in the holes 48 and 50 of the base 10 and plunger knob 28. The plunger 24 is then rotated counter-clockwise sufficiently to align the threaded hole 52 with one of the grooves formed on the plunger shank, usually groove 38. Generally, the spring 42 is constructed so that a rotation of about one-half turn is required, for such alignment so that a moderately strong torsionally, or rotation-biasing force is provided. The plunger is then held in a position whereby one of its groove portions is aligned with the hole 52 and the set screw 50 is screwed in sufficiently to engage the follower 54 in one of the grooves. The entire fitting assembly may then be placed on the track 14 with the studs 12 of the fitting assembly engaging the track.

It may be noted that the distance between the stud closest to the plunger and the plunger 24 is equal to one-half the spacing between the notches 26. The spacing enables the full engagement of a stud 12 with an unnotched portion of the track when the plunger 24 is engaged in a notch 26. Accordingly, the track fully engages the studs 12, and the fitting assembly is securely held against upward forces applied to the fitting base through ring 18.

Although the plunger assembly is useful in the fitting shown in the drawings, obviously it may be used in many other situations. For example, a plunger assembly can be fitted directly into a cargo pallet or the like which is to be fastened in a cargo holding space. In general, the plunger assembly can be used in any one of a variety of situations wherein an easily engaged and disengaged plunger is required. Therefore, while a particular embodiment of the invention has been shown and described, many modifications in the mechanism and its application may be made, and the scope of the invention is limited only by a just interpretation of the following claims.

We claim:
1. A cargo fitting for use with a track secured to a supporting structure, said cargo fitting comprising:
   a base having means secured thereto adapted to engage said track,
   a plunger assembly mounted on said base, said plunger assembly comprising a body portion mounted within said base, and adapted to be engageable with the track to fix the position of said cargo fitting thereon,
   follower means on said base engageable with cam means on the plunger body establishing a cam and follower arrangement therebetween, said cam means allowing both longitudinal and rotational movement of the plunger body relative to the base, said cam means having a first position and a second position, when the follower means is located in the said first position the plunger body is disengaged from the track, when the follower means is located in said second position the plunger body is engaged with the track, and
   a spring means mounted between said plunger body and said base, said spring means being pre-stressed to exert a longitudinal and a rotational force upon said plunger body, said longitudinal force tending to move the plunger body into non-engagement with the track when said follower means is located in said first position of the cam means, when said plunger body is moved into engagement with the track said longitudinal force acts to lock the follower means in said second position of the cam means, said rotational force tending to move the plunger body toward the second position of the cam means.

2. The apparatus of claim 1 in which:
   said cam is a groove on the periphery of said plunger body, said groove being continuously engaged by said follower, said follower being mounted within said base.

3. The apparatus of claim 1 in which:
   said spring means being a coil spring, said coil spring being mounted exteriorly and substantially concentric to said plunger body.

4. The apparatus of claim 1 in which:
   said plunger body having a knob portion at one end thereof, said knob portion being larger in cross-sectional area than the cross-sectional area of said plunger body, said spring means being mounted between said base and said knob portion.

5. The apparatus of claim 4 in which:
   said spring means being a coil spring, said coil spring being mounted exteriorly and substantially concentric to said plunger body, said coil spring being of such a diameter that it encompasses the cross-sectional area of said plunger body but is smaller than the cross-sectional area of said knob.

References Cited

UNITED STATES PATENTS

| | | | |
|---|---|---|---|
| 479,152 | 7/1892 | McClellan | 292—60 |
| 1,064,313 | 6/1913 | Garlock | 292—60 |
| 1,634,350 | 7/1927 | Briggs | 292—60 |
| 1,714,196 | 5/1929 | Vara | 292—60 |
| 2,357,608 | 9/1944 | Ostrowski | 292—60 |
| 2,422,693 | 6/1947 | McArthur | 24—223 |
| 2,688,289 | 9/1954 | Sterling | 105—369 |
| 2,688,504 | 9/1954 | Parker | 287—20.5 |
| 2,743,684 | 5/1956 | Elsner | 105—369 |

ARTHUR L. LA POINT, *Primary Examiner.*

DRAYTONE HOFFMAN, *Examiner.*